(12) United States Patent
Dewar

(10) Patent No.: US 6,955,534 B2
(45) Date of Patent: Oct. 18, 2005

(54) VALVE TO VALVE MELT TRANSFER DEVICE

(75) Inventor: Neil Dewar, Georgetown (CA)

(73) Assignee: Mold-Masters Limited, Ontario (CA)

( * ) Notice: Subject to any disclaimer, the term of this patent is extended or adjusted under 35 U.S.C. 154(b) by 232 days.

(21) Appl. No.: 10/640,685

(22) Filed: Aug. 14, 2003

(65) Prior Publication Data

US 2004/0071818 A1 Apr. 15, 2004

Related U.S. Application Data (60) Provisional application No. 60/402,919, filed on Aug. 14, 2002.

(51) Int. Cl.$^7$ .............. B29C 45/22; B29C 45/23
(52) U.S. Cl. ............... 425/564; 264/328.8; 425/572; 425/574
(58) Field of Search ............... 425/572, 574, 425/564; 264/297.2, 328.11, 328.8

(56) References Cited

U.S. PATENT DOCUMENTS

| | | |
|---|---|---|
| 4,212,626 A | 7/1980 | Gellert |
| 4,244,909 A | 1/1981 | Gellert |
| 4,380,426 A | 4/1983 | Wiles |
| 4,400,341 A | 8/1983 | Sorensen |
| 4,891,001 A | 1/1990 | Gellert |

(Continued)

FOREIGN PATENT DOCUMENTS

| | | |
|---|---|---|
| CA | 2271407 | 11/2000 |
| EP | 0 293 756 A2 | 7/1988 |
| JP | 58-051125 A | 3/1983 |
| JP | 0-848 A | 1/1994 |
| JP | 6-23806 A | 2/1994 |
| JP | 10-24453 A | 1/1998 |
| JP | 2000025077 | 1/2000 |
| JP | 2000-71288 A | 3/2000 |
| WO | WO 00/67985 A1 | 11/2000 |
| WO | WO 02/087846 A2 | 11/2002 |

OTHER PUBLICATIONS

"Heisskanalsysteme für Etagenformen zum Spritzen von Verpackungsartikeln" English translation included: "Hot–channel systems for mutlti–stage moulds for the injection moulding of packaging articles," R. Friedrich, Apr. 28–29, 1998 (seminar).

Nachtsheim E: "MIT Etagenwerkzeugen Kostengunstiger Produzieren," Plastverarbeiter, Zechner Ind Huethig Verlag GmbH. Speyer/Rhein, De, vol. 46, Nr. 6, pp. 50–52, 54, 56 XP000522417 Issn: 0032–1338 *figure 8*.

Mark Schlaeger G: "Etagenspritzgiesswerkzeuge Fuer Grassflaechige, Komplexe Formteile. Ömultilevel Injection Moulds For Complex Mouldings With Large Surface Areas," Junstsoffe, Carl Hanswer Verlag. Munchen, DE, vol. 83, Nr. 12, pp. 961–964 XP000414391, Issn: 0023–5563.

Li J et al: "Nadelverschlussdueseen Als Alternative," Kunststoffe, Carl Hanser Verlag. Munchen, DE, vol. 88, Nr. 6, pp. 792–794, 796 XP000766378 Issn: 0023–5563.

*Primary Examiner*—Tim Heitbrink
(74) *Attorney, Agent, or Firm*—Sterne, Kessler, Goldstein & Fox, P.L.L.C.

(57) ABSTRACT

A stack or tandem injection molding apparatus includes a first melt transfer nozzle coupled to a stationary platen and a second melt transfer nozzle coupled to a movable platen. A melt transfer device includes a first valve pin extending through a first melt transfer channel of the first melt transfer nozzle and a second valve pin extending through a second melt transfer channel of the second melt transfer nozzle. At least one groove is provided in the outer surface of the first valve pin. The first valve pin is movable relative to the first and second melt transfer nozzles to selectively locate the groove across a portion of the first melt transfer channel and a portion of the second melt transfer channel to allow melt to flow therebetween in the mold closed position and to prevent drooling in the mold open position.

16 Claims, 10 Drawing Sheets

U.S. PATENT DOCUMENTS

| | | |
|---|---|---|
| 4,965,028 A | 10/1990 | Maus et al. |
| 5,011,646 A | 4/1991 | Bertschi |
| 5,049,343 A | 9/1991 | Sorensen |
| 5,229,145 A | 7/1993 | Brown et al. |
| 5,262,119 A | 11/1993 | Smith |
| 5,458,843 A | 10/1995 | Brown et al. |
| 5,460,510 A | 10/1995 | Gellert |
| 5,513,976 A | 5/1996 | McGrevy |
| 5,620,723 A | 4/1997 | Glaesener et al. |
| 5,683,731 A | 11/1997 | Deardurff et al. |
| 5,846,472 A | 12/1998 | Rozema et al. |
| 5,941,637 A | 8/1999 | Maurer |
| 6,086,356 A | 7/2000 | Yu |
| 6,305,923 B1 | 10/2001 | Godwin et al. |
| 6,382,528 B1 | 5/2002 | Bouti |
| 6,835,060 B2 * | 12/2004 | Sicilia ................. 425/572 |

* cited by examiner

VALVE TO VALVE MELT TRANSFER DEVICE

This application claims the benefit of U.S. Provisional Application No. 60/402,919, filed Aug. 14, 2002.

FIELD OF THE INVENTION

The present invention relates generally to an injection molding apparatus and, in particular, to a melt transfer device that improves melt transfer in a stack or a tandem injection molding device by reducing drooling and stringing of the melt.

BACKGROUND OF THE INVENTION

Stack and tandem injection molding devices provide an advantage over single molding in that each enables the output of an injection molding machine to be at least doubled without significantly increasing its size. Stack mold configurations generally employ a stationary first platen, a movable center platen and a movable second platen. The mold cavities are conventionally located on opposing faces of the movable center platen. The movable center platen and the second movable platen reciprocate to open and close the mold cavities during a production cycle. In a stack molding apparatus, the melt runner system or the manifold system extends through the center platen in order to reach the mold cavities located on each side of the center platen via an equal path length.

Typically, multi-cavity stack molds use a single and movable sprue bar, or transfer nozzle, to provide a direct melt channel between the nozzle of the injection molding machine and its hot runner distributor, or manifold, which is mounted in the center section of the stack mold. The manifold delivers melt from the sprue bar, or transfer nozzle, into injection nozzles that are associated with each individual mold cavity. "Sprue bars" are typically thermal gated, whereas "transfer nozzles" are valve gated.

As a result of the reciprocating action of the movable platens, the sprue bar, or transfer nozzle, is continuously coupled to and decoupled from the melt source. It is therefore necessary to control the flow of the pressurized melt stream when the sprue bar, or transfer nozzle, is decoupled from the melt source so that substantially no drooling and no stringing occurs. In the case of tandem injection molding, where there are different parts in the mold that are filled in separate cycles, there is a higher potential for drooling because of the increase in cycles.

Valve gated stack injection molding apparatus, such as disclosed in U.S. Pat. Nos. 4,212,626, 4,244,909 and 5,460,510 which are incorporated herein by reference thereto, control the flow of melt between platens using valve pin members located in the melt channels of transfer nozzles. In the valve gated stack injection molding apparatus of U.S. Pat. No. 5,460,510, the upstream and downstream nozzles each have valve pins that reciprocate between retracted open positions and closed positions in which the valve pins are seated in respective gates. Diagonal vent bores are formed in the valve pins to provide a path for melt to flow back into the melt channel of the nozzle when the valve pins are in the closed position.

Tandem molds are known and they provide at least two molds that can be operated sequentially in order to mold different parts that may require different cooling cycle times. Reference is made in this regard to U.S. Pat. No. 4,400,341, U.S. Pat. No. 5,049,343 and U.S. Pat. No. 5,620,723, herein incorporated by reference, that show injection molding machines where molded parts are injected in two different mold plates that can be operated sequentially in order to adjust injection molding parameters such as the cooling time.

It is therefore an object of the present invention to provide a melt transfer device for substantially reducing the occurrence of drooling and stringing in a stack or a tandem injection molding apparatus.

SUMMARY OF THE INVENTION

Accordingly it is an object of the present invention to provide a melt transfer device for substantially reducing the occurrence of drooling and stringing in a stack injection molding apparatus used for both typical applications and tandem molding applications.

To this end, one of the aspects of this invention provides a first and second melt transfer nozzle in a stationary platen and a moving platen, respectively. Each melt transfer nozzle includes a melt channel, a melt gate, and a valve pin. At least one valve pin has a melt groove portion and a guiding portion. In one embodiment, the melt groove portion in the valve pin includes an annular opening. The valve pins are actuated together in the same direction to remain in contact with each other and to position the groove such that it spans across the melt gates, thereby allowing the melt to move, i.e., to transfer, between the melt channels of the first and second melt transfer nozzles. In this manner, the aforementioned first and second melt transfer nozzles act as a melt transfer device.

In other embodiments, at least one valve pin may have a plurality of grooves, wherein the grooves may be of any depth. The melt transfer device may also be located between two moving platens in larger stack molds.

Further objects and advantages of the invention will appear from the following description taken together with the accompanying drawings.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Referring now to FIGS. 1 to 4, a stack injection molding apparatus is generally indicated by reference numeral 10. As shown, a base 20 supports a stationary first platen 14, a movable center platen 16 and a movable second platen 18. The movable center platen 16 and movable second platen 18 are coupled to the stationary first platen 14 and are movable relative thereto, as indicated by arrows 22 and 24, by a positioning mechanism (not shown). The movable center platen 16 and the movable second platen 18 split the stack injection molding apparatus 10 at parting lines 26 and 28, respectively. A person skilled in the art will understand that the same components may be operated differently in a tandem mold to achieve a different purpose, such as a different cooling time between the mold cavities.

Figure 2:
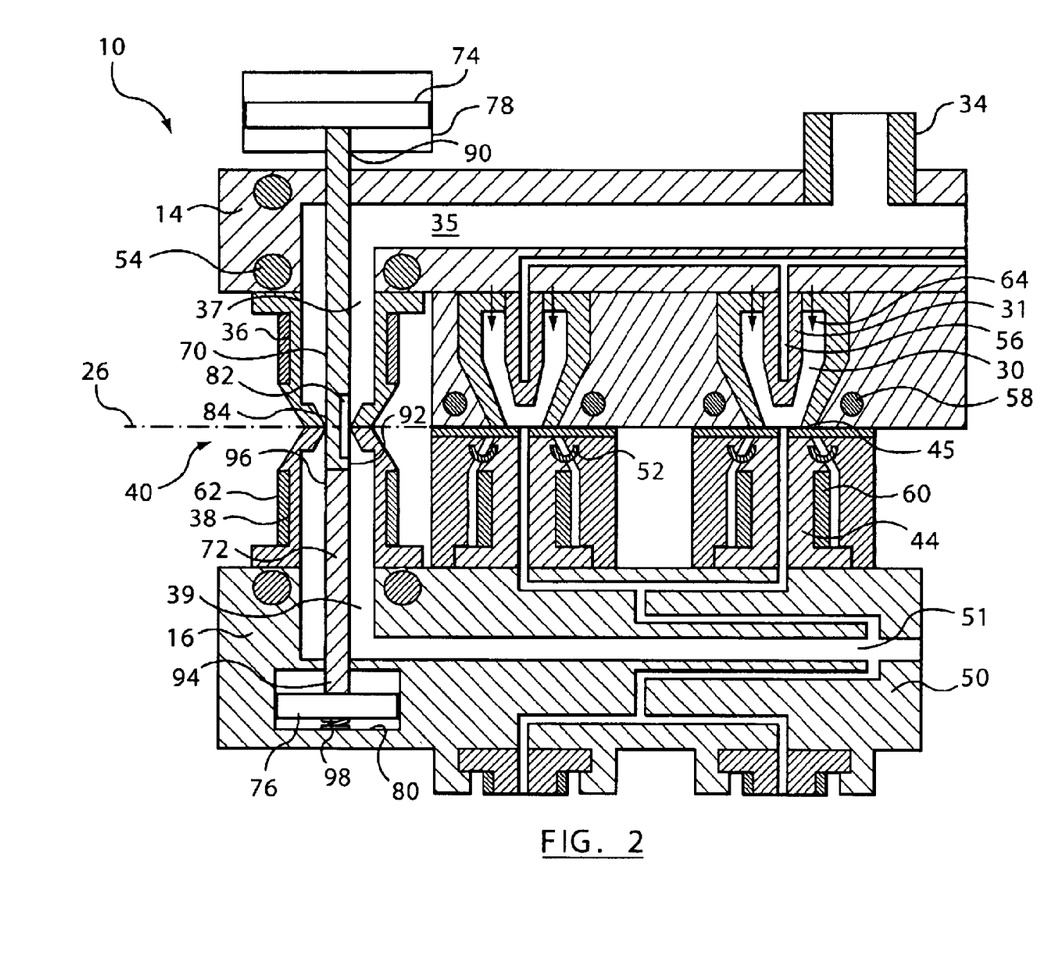
FIG. 2 is an expanded partial sectional view of an upper portion of the stack injection molding apparatus of FIG. 1 rotated 90° that illustrates a melt delivery position with the melt transfer device in an open position.

A manifold 50 is located in the movable center platen 16 to deliver melt to a series of nozzles 44. As shown in FIG. 2, nozzle seals 52 are provided adjacent a lower end of each nozzle to locate the nozzles 44 within the injection molding apparatus 10. Heaters 54 are provided in the stationary first platen 14 and the movable center platen 16 to maintain the melt stream at a desired temperature as it travels through the injection molding apparatus 10. Each nozzle 44 includes a nozzle heater 60 that is embedded therein or coupled thereto in any manner known in the art.

A first series of mold cavities 30 is located between the movable center platen 16 and a first series of mold cores 31, which project from the stationary first platen 14. Similarly, a second series of mold cavities 32 is located between the movable center platen 16 and a second series of mold cores 33, which project from the movable second platen 18. The nozzles 44 deliver melt to the mold cavities 30 and 32 through mold gates 45. The mold cavities are cooled by first cooling channels 58 that are located adjacent the mold cavities 30, 32. Second cooling channels 56 extend into the mold cores 31 and 33 to provide additional cooling for the molded parts (not shown). When properly cooled, the molded parts are air ejected from the mold cavities 30, 32, as indicated by arrows 64 in FIG. 2.

A sprue bushing 34 extends between a machine nozzle 12 and a melt channel 35. A first melt transfer nozzle 36, having a first melt transfer channel 37, is coupled to an outlet of the melt channel 35. A second melt transfer nozzle 38, having a second melt transfer channel 39 is coupled to the first melt transfer nozzle 36 to receive melt therefrom and deliver the melt to a manifold 50. The first and second melt transfer nozzles 36, 38 are provided with heaters 62 (shown in FIG. 2), which are coupled thereto. Alternatively, the heaters may be embedded in an outer surface of the first and second melt transfer nozzles 36, 38.

Figure 5:
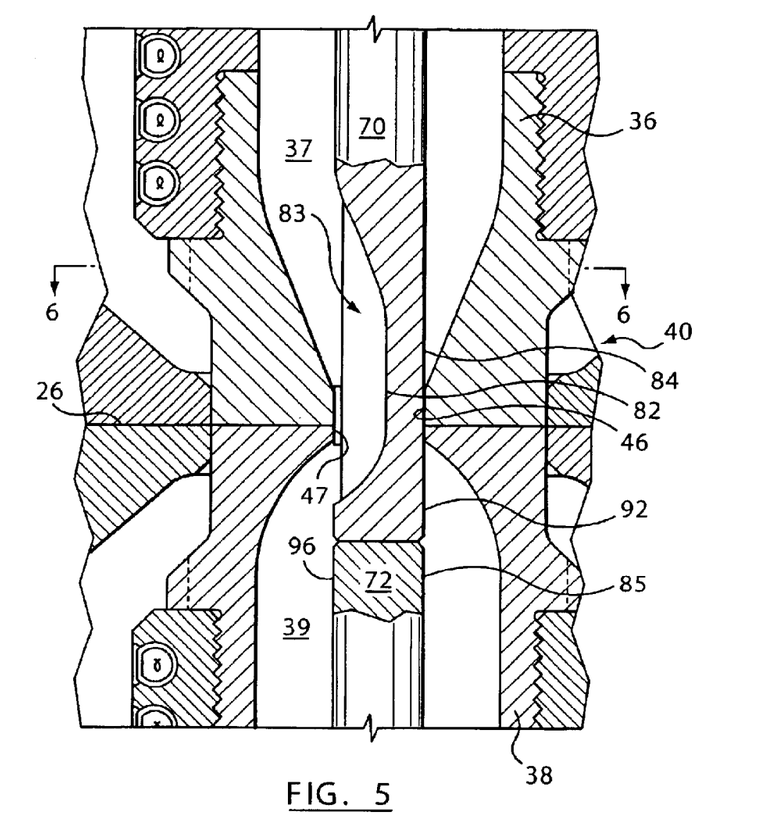
FIG. 5 is an expanded partial sectional view of a melt transfer device of the stack injection molding apparatus of FIG. 1 rotated 90° that illustrates the melt transfer device in an open position.
Figure 7:
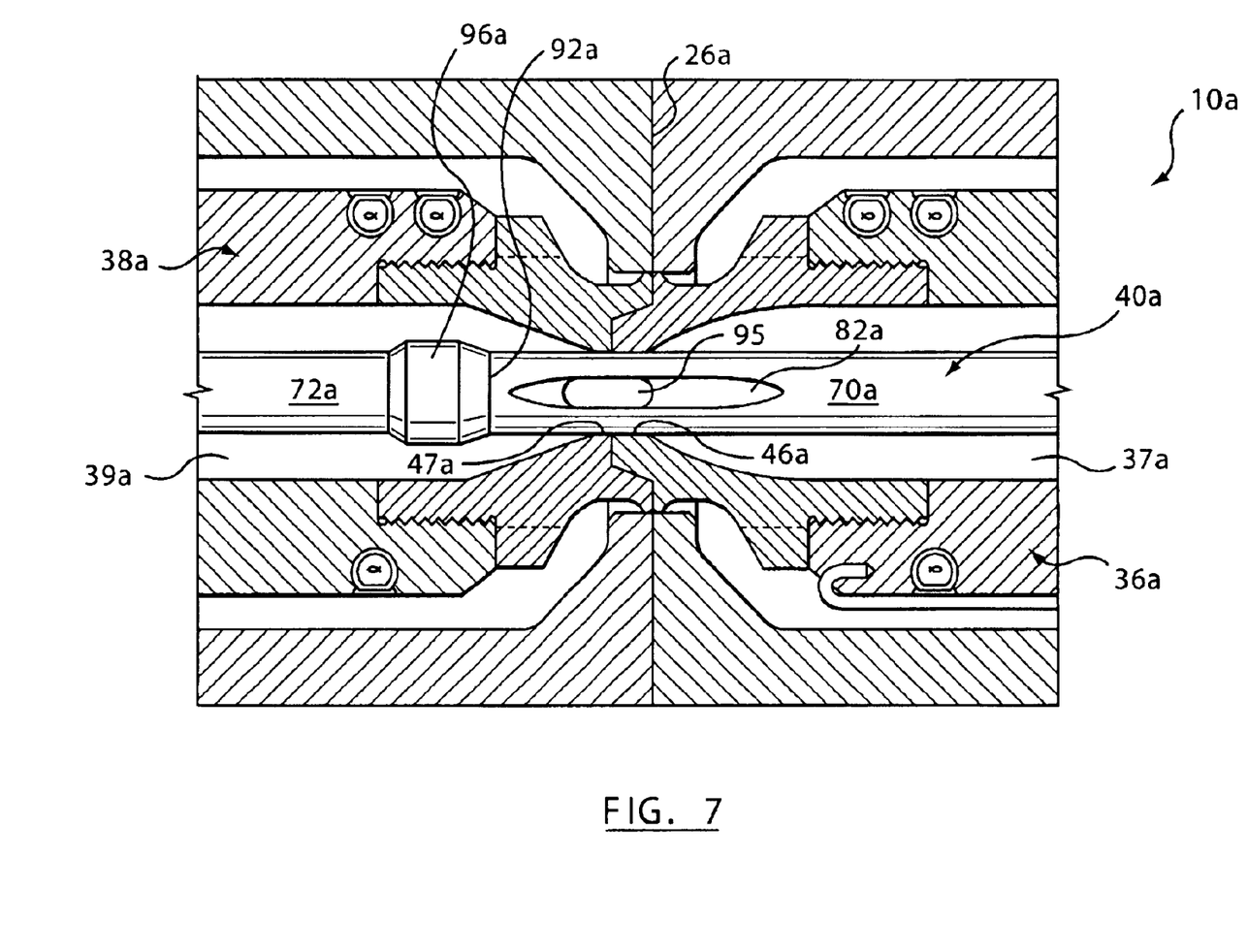
FIG. 7 is an expanded partial sectional view of a portion of the stack injection molding apparatus of FIG. 1 including a melt transfer device according to another embodiment of the present invention, in which the stack injection molding apparatus is in a melt delivery position and the melt transfer device is in an open position.
Figure 8:
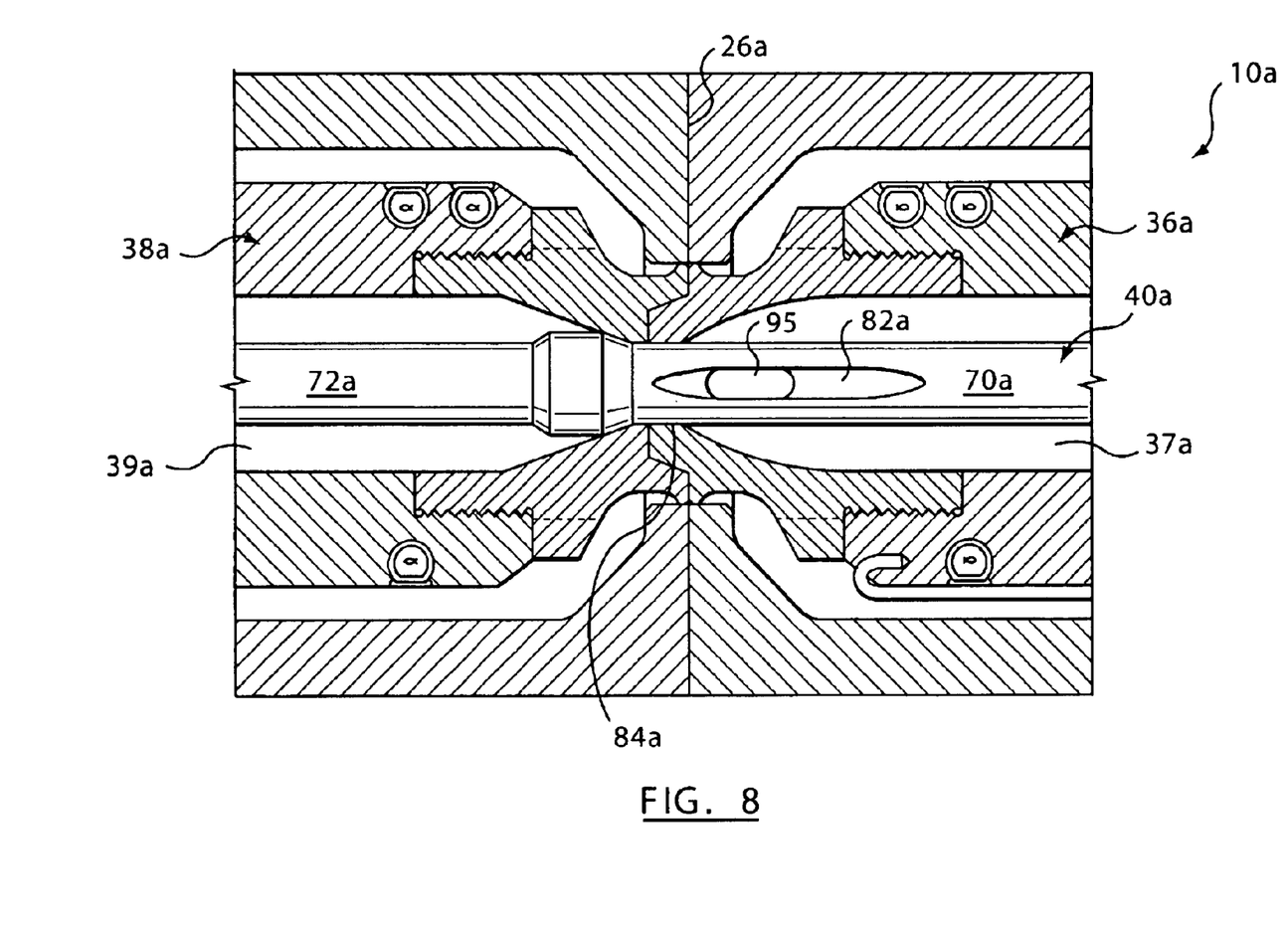
FIG. 8 illustrates the melt transfer device of FIG. 7 in a closed position.
Figure 9:
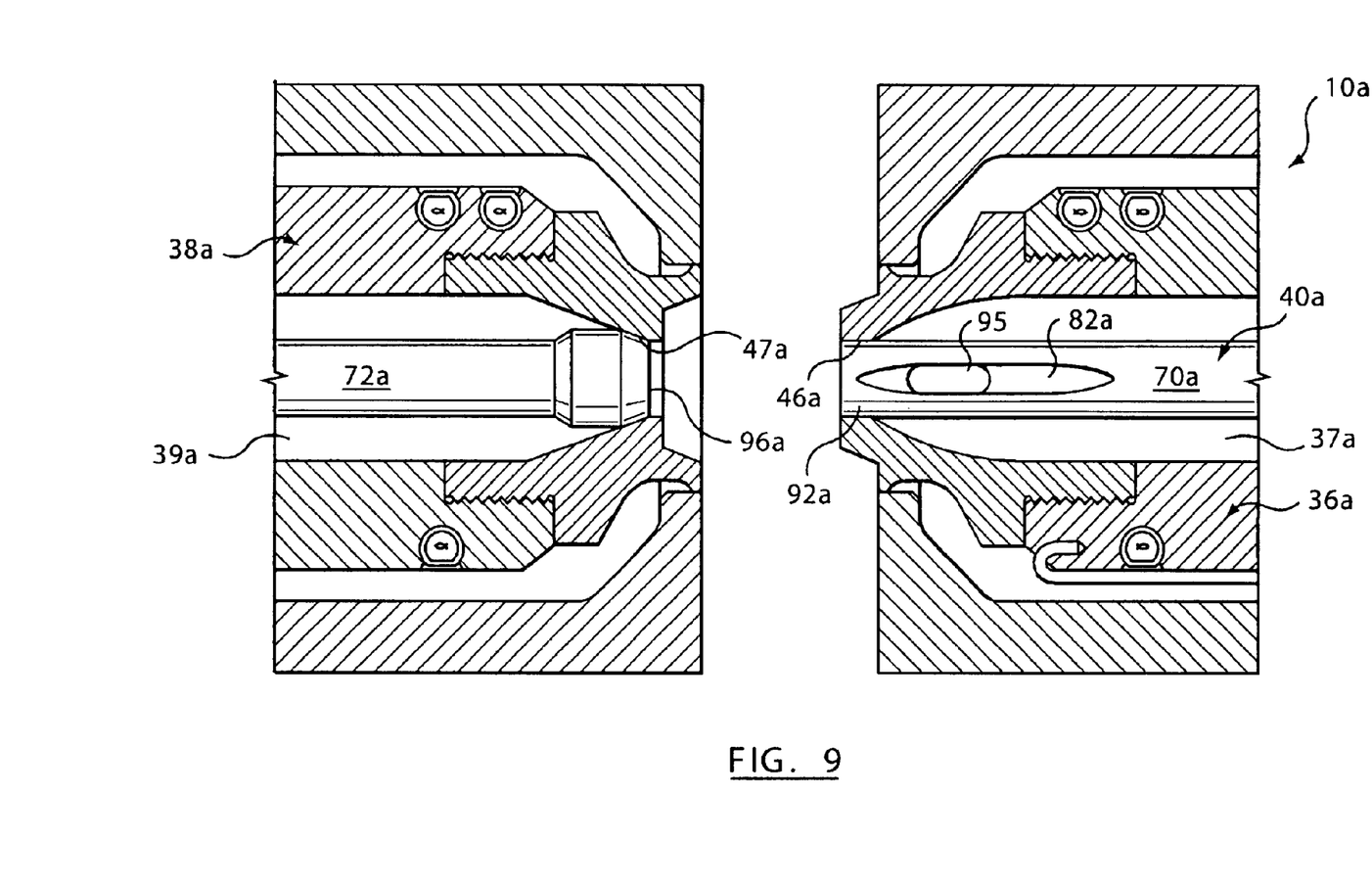
FIG. 9 illustrates the stack injection molding apparatus of FIG. 7 in the melt interrupted position with the melt transfer device in the closed position.

A melt transfer device 40 is provided between the first melt transfer nozzle 36 and the second melt transfer nozzle 38 to control the flow of melt therebetween. The melt transfer device 40 comprises a first valve pin 70 that extends through the first melt transfer channel 37 of the first melt transfer nozzle 36 and a second valve pin 72 that extends through the second melt transfer channel 39 of the second melt transfer nozzle 38. As shown in FIG. 5 an expanded partial sectional view of a melt transfer device of the stack injection molding apparatus of FIG. 1, an outer diameter of valve pin 70 is sized to mate with melt transfer gates 46 and 47 of first and second melt transfer nozzles 36, 38. In one embodiment, an outer diameter of valve pin 72 is sized to mate with melt transfer gates 46 and/or 47 of first and second melt transfer nozzles 36, 38. However in a further embodiment, as illustrated in FIGS. 7 through 9, a tip at a second end 96a of valve pin 72a is configured to close melt transfer gate 47a of second melt transfer nozzle 38a but not to pass therethrough.

As shown in FIG. 2, the first valve pin 70 includes a first end 90 and a second end 92. The first end 90 of the first valve pin 70 is coupled to a piston 74 that is movable within a cylinder 78. The piston 74 is air driven. Passages (not shown) are provided on either side of the piston 74 to allow air to enter and leave the cylinder 78. The second valve pin 72 includes a first end 94 and a second end 96. The second end 96 of the second valve pin 72 abuts the second end 92 of the first valve pin 70. Similar to the first valve pin 70, the first end 94 of the second valve pin 72 is coupled to a piston 76 that is movable within a cylinder 80. The piston 76 moves in response to movement of the first valve pin 70. A spring 98 is provided within the cylinder 80 adjacent the piston 76 to bias the second valve pin 72 toward the first valve pin 70. The first and second valve pins 70, 72 may alternatively be actuated electrically or by any other known means.

According to an embodiment of the present invention, a groove, or notch, 82 is formed in an outer surface 84 of the first valve pin 70 adjacent the second end 92 thereof. The groove 82 extends along a portion of the first valve pin 70 and has a generally smooth profile 83, which is shown in FIG. 5. The groove 82 forms part of the melt channel when the melt transfer device is in the open position of FIG. 2. The profile 83 is shaped to optimize the melt flow past the groove 82. It will be appreciated by a person skilled in the art that the profile 83 of the groove 82 may vary along the length thereof. The groove 82 is formed in one side of the valve pin 70 so that the melt flowing through the melt transfer device 40 is in contact with generally the same amount of surface area as encountered in a valve gated melt transfer device in which both valve pins retract. As a result, the melt is not subjected to a large increase in shear, therefore, there is minimal pressure loss as the melt passes through the melt transfer device 40.

Figure 6:
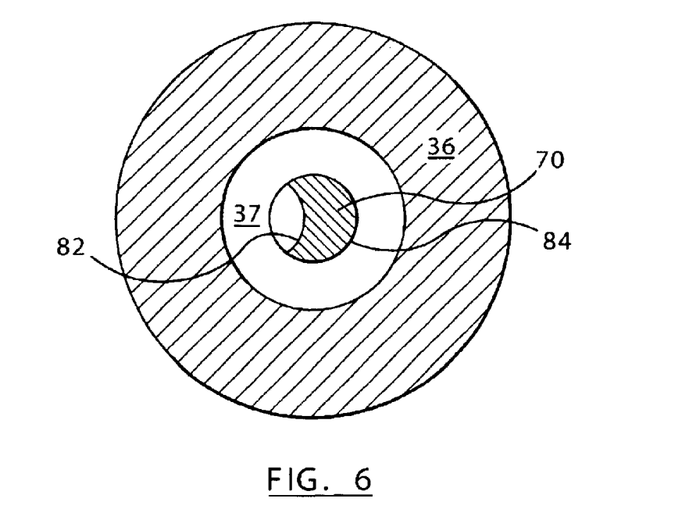
FIG. 6 is a cross-sectional view taken along line 6—6 of FIG. 5.

As shown in FIG. 6, the cross-sectional area of the valve pin 70 at the groove 82 location is generally crescent shaped. The crescent shape of the valve pin 70 allows the molten material to have a generally tubular flow as it flows past the groove 82 from the first melt transfer nozzle 36 to the second melt transfer nozzle 38, when the melt transfer device 40 is in the open position. In addition, the crescent shape of the valve pin 70 optimizes its strength in the groove 82 area.

As shown in FIGS. 2 to 5, at least a portion of the outer surfaces 84, 85 of the valve pins 70, 72 of the melt transfer device 40 is continuously engaged in the melt transfer gates 46 and 47 as a guiding portion. As a result, wear of the melt transfer gates 46, 47 is reduced. The continuous engagement of the valve pins 70, 72 with the melt transfer gates 46, 47 additionally functions to align and guide the valve pins 70, 72 within the first and second melt transfer nozzles 36, 38. This is particularly useful in cases where the injection pressure is high and the transfer nozzle elements are very long.

It will be appreciated that the first and second valve pins 70, 72 could be reversed so that the groove 82 is provided on the valve pin 72, which extends through the second transfer element 38.

Figure 3:
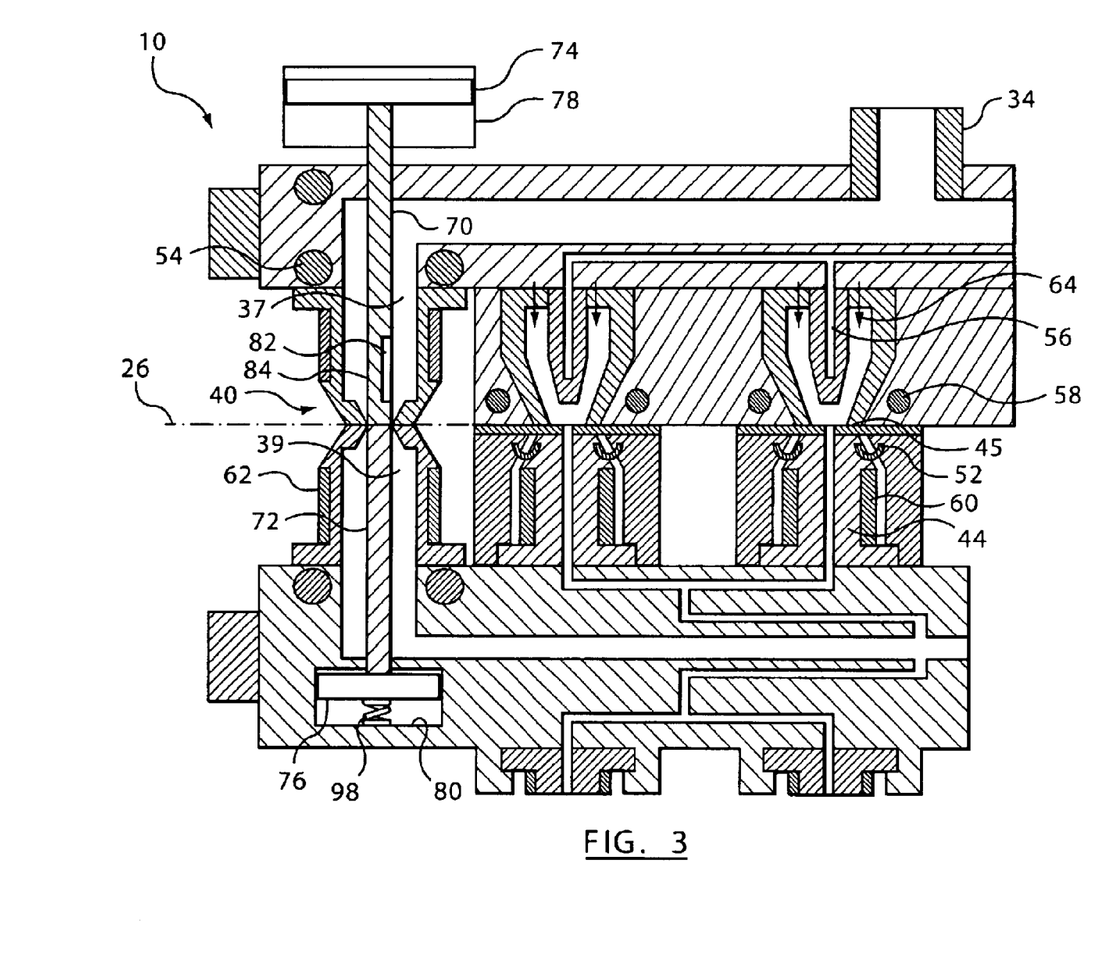
FIG. 3 is an expanded partial sectional view of an upper portion of the stack injection molding apparatus of FIG. 1 rotated 90° that illustrates a melt delivery position with the melt transfer device in a closed position.

Operation of the stack injection molding apparatus 10 according to the present invention will now generally be described with reference to FIGS. 2 to 4. FIG. 2 shows the stack injection molding apparatus in the melt delivery position and the melt transfer device 40 in the open position. In this position, a melt stream of moldable material under pressure is delivered from the machine nozzle 12, through the sprue bushing 34, the melt channel 35 and first and second melt transfer nozzles 36, 38 via melt transfer device 40 to a manifold channel 51 of the manifold 50. The manifold 50 distributes the melt stream to the series of nozzles 44. The melt stream flows through the nozzles 44, past the mold gates 45 and into mold cavities 30, 32, where the melt is cooled to produce molded parts (not shown).

Once the molded parts have been produced, the flow of melt from the machine nozzle 12 is halted. The pistons 74, 76 are actuated to move the first and second valve pins 70, 72 of the melt transfer device 40 from the open position of FIG. 2 towards the closed position of FIG. 3. As the first valve pin 70 retracts, the melt that is located in the groove 82 is carried away from the melt transfer gates 46, 47 and into the first melt transfer channel 37. The outer surface 84 of the valve pin 70 travels past the melt transfer gates 46, 47, to substantially clear all of the melt from the melt transfer gates 46, 47 prior to opening the mold cavities 30, 32. The valve pins 70, 72 are then seated in the melt transfer gates 46, 47 to block the flow of melt between the first and second passages 37, 39 of the first and second melt transfer nozzles 36, 38, respectively, as shown in FIG. 3. During movement from the open position of FIG. 2 towards the closed position of FIG. 3 and vice versa, the adjacent ends 92, 96 of first and second valve pins 70, 72 remain in contact to prevent the melt from coming therebetween. As such, the melt does not string or drool from either of ends 92, 96 of first and second valve pins 70, 72 when the stack injection molding apparatus is in the melt interrupted position illustrated in FIG. 4.

Figure 4:
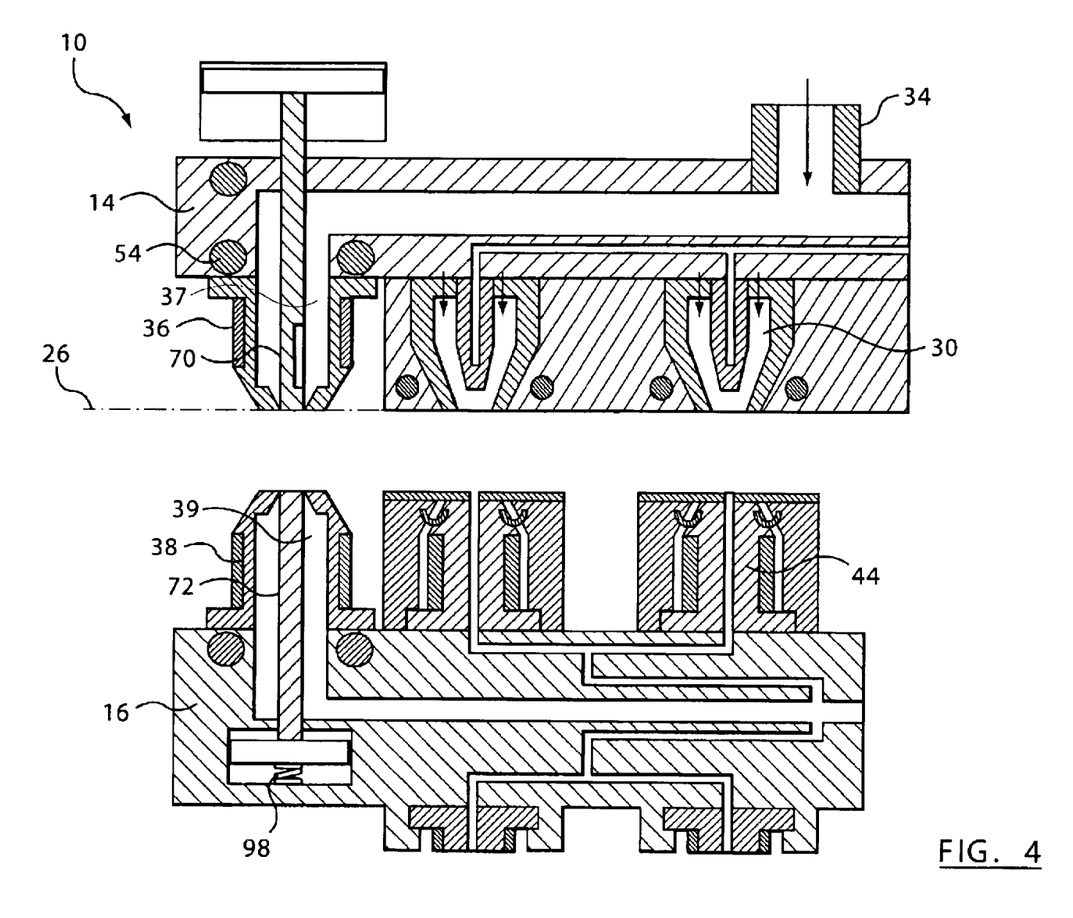
FIG. 4 is an expanded partial sectional view of an upper portion of the stack injection molding apparatus of FIG. 1 rotated 90° that illustrates a melt interrupted position with the melt transfer device in the closed position.

The movable center platen 16 and the movable second platen 18 then separate from the stationary first platen 14, at parting lines 26 and 28, respectively, and move into a melt interrupted position, which is shown in FIG. 4. As the platens 14, 16 and 18 separate there is substantially no stringing between the first and second melt transfer nozzles 36 and 38. In this position, the molded parts are ejected from the mold cavities 30, 32.

Referring to FIGS. 7, 8 and 9, a stack injection molding apparatus 10*a* according to another embodiment of the present invention is shown, in which like parts are identified by like reference numerals. The stack injection molding apparatus 10*a* is similar to the stack injection molding apparatus 10 of FIG. 1, however, melt transfer device 40 has been replaced with melt transfer device 40*a*.

Melt transfer device 40*a* is provided between first melt transfer nozzle 36*a* and second melt transfer nozzle 38*a* to control the flow of melt therebetween. The melt transfer device 40*a* comprises a first valve pin 70*a* that extends through first melt transfer channel 37*a* of the first melt transfer nozzle 36*a* and a second valve pin 72*a* that extends through second transfer channel 39*a* of the second melt transfer nozzle 38*a*. The valve pins 70*a*, 72*a* are axially movable within the melt transfer channels 37*a* and 39*a* in a similar manner to valve pins 70 and 72 of FIGS. 2 to 4. First and second valve pins 70*a*, 72*a* include free ends 92*a* and 96*a*, respectively, for mating with respective melt transfer gates 46*a* and 47*a* of the melt transfer nozzles 36*a*, 38*a*. The free ends 92*a* and 96*a* abut one another when the injection molding apparatus 10*a* is in a melt delivery position, as shown in FIGS. 7 and 8.

Figure 10:
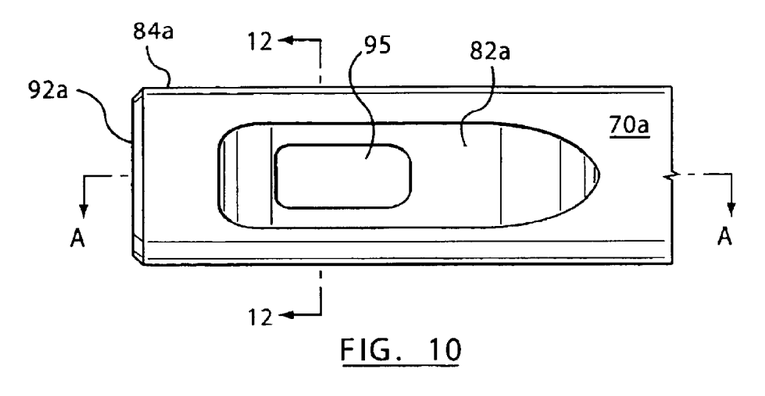
FIG. 10 is an expanded partial sectional view of a tip of a valve pin according to the embodiment of the melt transfer device illustrated in FIGS. 7 to 9.
Figure 11:
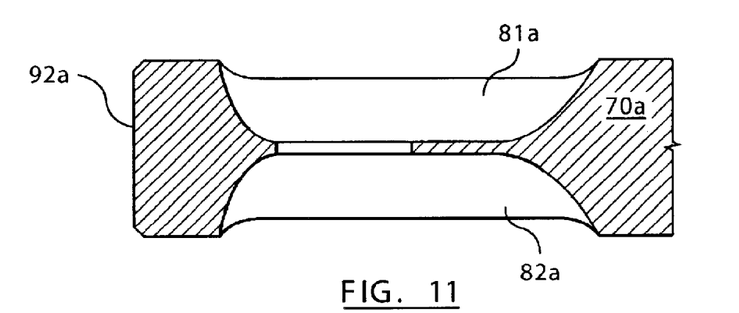
FIG. 11 is a partial sectional view taken along line A—A of FIG. 10.
Figure 12:
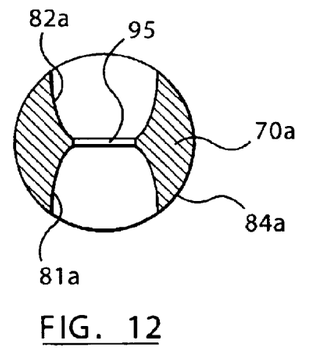
FIG. 12 is a cross-sectional view taken along line 12—12 of FIG. 10.

Referring to FIGS. 10 to 12, a tip portion of first valve pin 70*a* is shown. A pair of opposing grooves, or notches, 81*a* and 82*a* is formed in an outer surface 84*a* of the first valve pin 70*a*. The grooves 81*a* and 82*a* extend along a portion of the valve pin 70*a* on opposite sides thereof. The grooves 81*a*, 82*a* intersect one another to provide an aperture 95 that extends through the first valve pin 70*a*. When the melt transfer device 40*a* is in the open position, the aperture 95 of the melt transfer device 40*a* is aligned with parting line 26*a* of the injection molding apparatus 10*a* to allow melt to flow from the first melt transfer channel 37*a* to the second melt transfer channel 39*a*. Each of the grooves 81*a*, 82*a* has a generally smooth profile which is shaped to optimize the melt flow through the aperture 95.

It will be appreciated by a person skilled in the art that the grooves 81*a* and 82*a* may vary in length and the transition from the outer surface 84*a* to the aperture 95 may be more or less gradual depending on the application. Further, the aperture 95 may be sized to accommodate a desired volume flow rate between the first melt transfer nozzle 36*a* and the second melt transfer nozzle 38*a*. The opposing grooves 81*a*, 82*a* may have different profiles from one another, if desired.

Operation of the stack injection molding apparatus 10*a* will now generally be described with reference to FIGS. 7 to 9. FIG. 7 shows the stack injection molding apparatus 10*a* in the melt delivery position and the melt transfer device 40*a* in the open position. In this position, a melt stream of moldable material under pressure is delivered from the first melt transfer nozzle 36*a* through the second melt transfer nozzles 38*a* to fill a series of mold cavities. Once an injection cycle is completed, the melt transfer device moves to the closed position of FIG. 8. As the valve pin 70*a* retracts, the outer surface 84*a* of the valve pin 70*a* adjacent the free end 92*a* thereof moves past the melt transfer gates 46*a*, 47*a*, to substantially clear all of the melt therefrom. The valve pins 70*a*, 72*a* are then seated in the melt transfer gates 46*a*, 47*a* to block the flow of melt between the first melt transfer channel 37*a* and the second melt transfer channel 39*a*. The stack injection molding apparatus 10*a* then separates at parting line 26*a*, as shown in FIG. 9, to allow the molded parts to be ejected. The melt transfer device 40*a* ensures that substantially no stringing occurs between the first and second melt transfer nozzles 36*a*, 38*a*.

During operation, the outer surface 84*a* of the valve pin 70*a* that is located between the opposing grooves 81*a*, 82*a* is continuously engaged in the melt transfer gates 46a, 47a. This aligns the valve pins 70a, 72a within the first and second melt transfer nozzles 36a, 38a and reduces wear of the melt transfer gates 46a, 47a.

Figure 13:
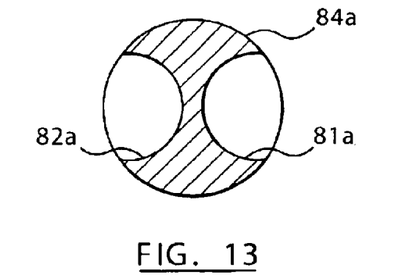
FIG. 13 is a cross-sectional view of a valve pin of a melt transfer device according to another embodiment of the present invention.

In another embodiment, the opposing grooves 81a, 82a of the first valve pin 70a do not intersect, as shown in FIG. 13. Therefore, no aperture 95 is provided in the valve pin 70a. When the melt transfer device is in the open position, melt flows past the opposing grooves 81a and 82a to travel between the first melt transfer nozzle 36a to the second melt transfer nozzle 38a.

Figure 14:
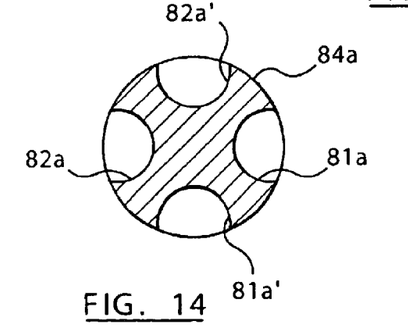
FIG. 14 is a cross-sectional view of a valve pin of a melt transfer device according to another embodiment of the present invention.

In still another embodiment, which is shown in FIG. 14, four grooves 81a, 82a, 81a' and 82a' are provided in the outer surface 84a. Similar to the previously described embodiments, melt flows past the grooves 81a, 82a, 81a' and 82a', to travel between the first melt transfer nozzle 36a and the second melt transfer nozzle 38a, when the melt transfer device is in the open position. Although four grooves are shown in the embodiment of FIG. 14, it will be appreciated that any suitable number of grooves may be provided in the outer surface of the valve pin 70a.

Further, the valve pin 70a may have any suitable cross-sectional shape that allows melt to pass between the first and second melt transfer nozzles 36a, 38a, while still maintaining at least a portion of the outer surface 84a of the valve pin 70a in contact with the melt transfer gates 46a, 47a to allow for proper alignment of the valve pin 70a within the melt transfer nozzle 36a.

Figure 15:
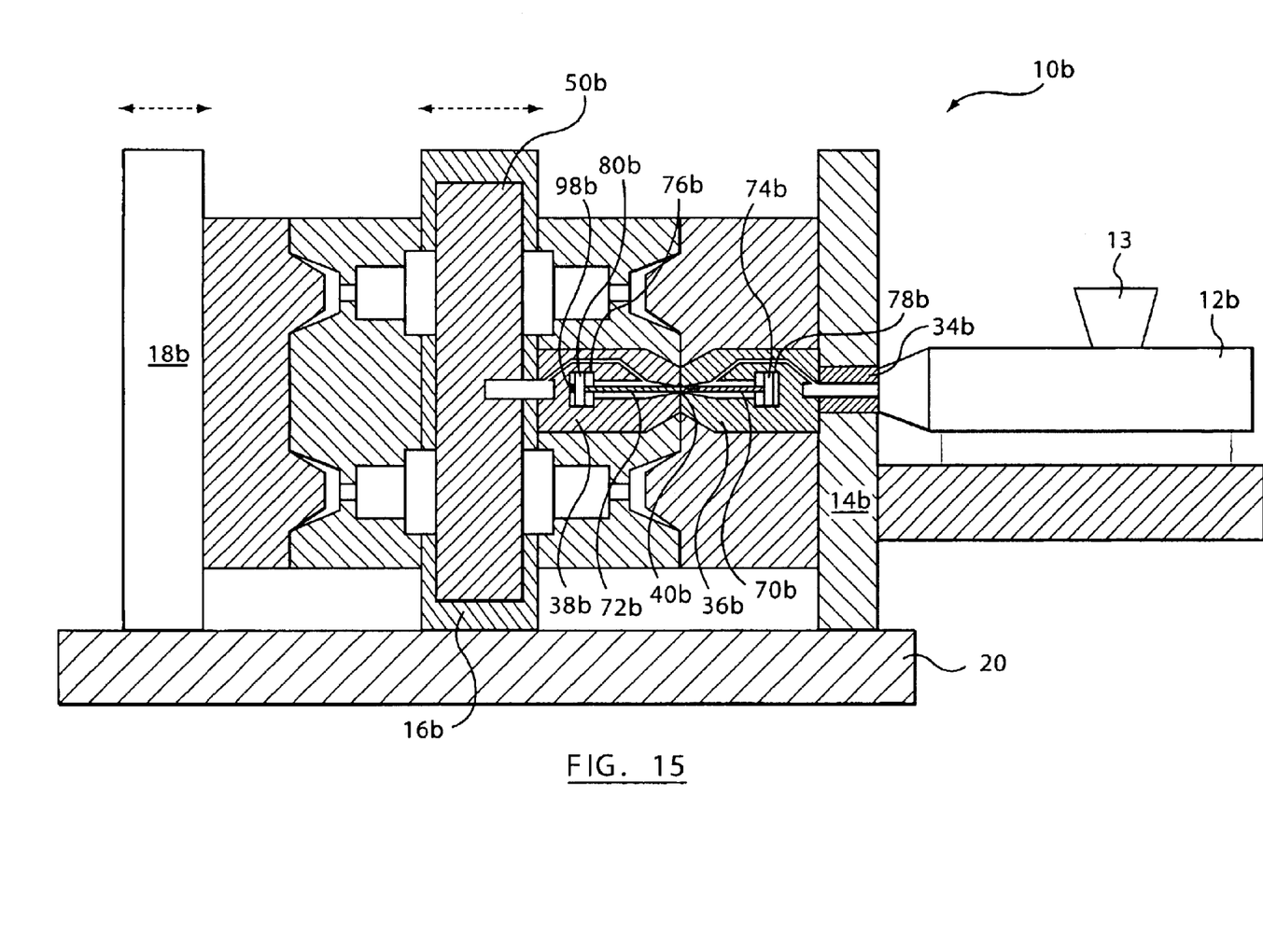
FIG. 15 is a schematic side sectional view of a stack injection molding apparatus including a melt transfer device according to another embodiment of the present invention.

Referring to FIG. 15, a stack injection molding apparatus 10b is shown. The stack injection molding apparatus 10b includes a sprue bushing 34b which extends through stationary first platen 14b to deliver melt to first and second melt transfer nozzles 36b and 38b, which are in-line nozzles. The first and second melt transfer nozzles 36b, 38b are arranged in-line between machine nozzle 12b and manifold 50b to deliver a melt stream of moldable material under pressure.

Melt transfer device 40b comprises a first valve pin 70b and a second valve pin 72b. The first valve pin 70b is actuated by piston 74b that is movable within cylinder 78b. Second valve pin 72b moves in response to the movement of the first valve pin 70b. Spring 98b is provided within cylinder 80b adjacent the piston 76b to bias the second valve pin 72b toward the first valve pin 70b. As shown, the cylinders 78b, 80b are disposed part way along the first and second melt transfer nozzles 36b, 38b.

The first valve pin 70b of melt transfer device 40b may include a single groove 82, as shown in FIGS. 2 to 5 or a pair of opposed grooves 81a and 82a and an aperture 95, as shown in FIGS. 7 to 12, to allow melt to flow between the first melt transfer nozzle 36b and the second melt transfer nozzle 38b. Alternatively, the first valve pin 70b may include one of the groove arrangements shown in FIGS. 13 and 14.

Any type of in-line valve gated nozzle may be used in the stack injection molding apparatus 10b, such as the nozzles disclosed in U.S. Pat. Nos. 4,212,626, 4,380, 426 and 6,086,356, for example.

The melt transfer devices 40, 40a and 40b of the present invention can be used in any valve gated melt transfer arrangement in which melt is being transferred directly from a first flow passage to a second flow passage. For example, the melt transfer device may be incorporated into the melt distribution system of multilevel stack mold such as disclosed in PCT Publication No. WO 00/67985, which is herein incorporated by reference.

Figure 1:
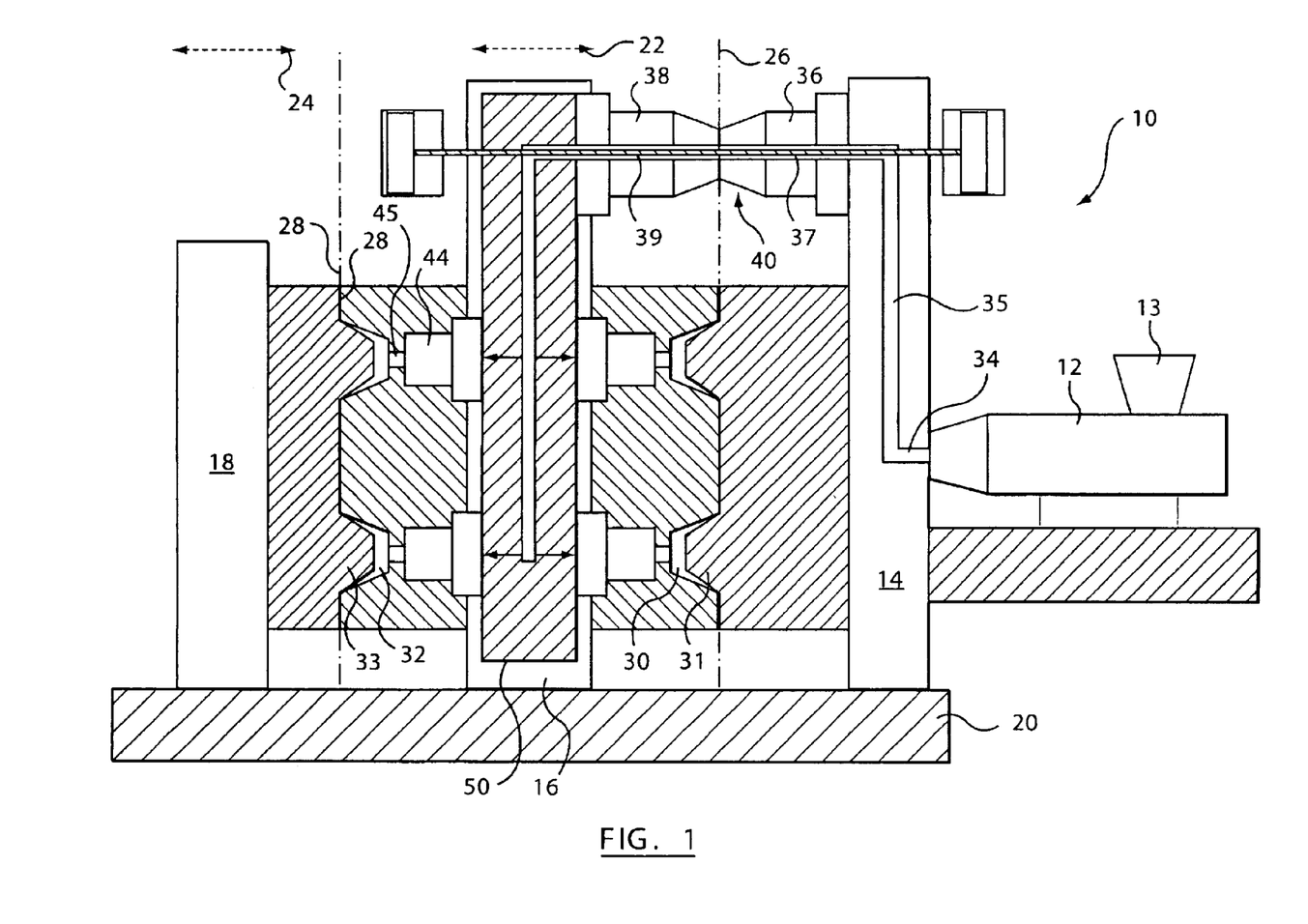
FIG. 1 is a schematic side sectional view of a stack injection molding apparatus including a melt transfer device according to an embodiment of the present invention.

According to another embodiment of the present invention, the melt transfer in a four level stack mold can be done using a combination of a central melt transfer device, as shown in FIG. 15, to feed molten material to first and second mold faces and a lateral melt transfer device, as shown in FIG. 1, to feed molten material to third and fourth mold faces.

In each of the above-described embodiments, it will be appreciated that the first and second valve pins may be reversed so that the second valve pin includes one of the groove arrangements disclosed and the first valve pin includes a continuous outer surface.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding hot runner melt transfer device for transporting a melt between two melt channels that are movable relative to each other, comprising:
   a first melt transfer channel to provide a melt stream through a first melt transfer gate controlled by a first movable valve pin, positioned within said first transfer channel; and
   a second melt transfer channel to receive said melt stream through a second melt transfer gate controlled by a second movable valve pin positioned within said second melt transfer channel,
   whereby at least one of said movable valve pins has at least one melt groove portion and at least one guiding portion on an outer surface thereof, and wherein said valve pin guiding portion makes contact with said first and second melt transfer gates when said valve pin is positioned within said first and second melt transfer channels such that said valve pin melt groove connects said first and second melt transfer channels.

2. The injection molding apparatus of claim 1, wherein said melt groove portion includes an aperture through said moveable valve pin.

3. The injection molding apparatus of claim 1, further comprising a second groove provided in said valve pin opposite to said at least one melt groove.

4. The injection molding apparatus of claim 3, wherein said at least one melt groove and said second groove intersect to provide an aperture through said valve pin.

5. The injection molding apparatus of claim 1, wherein a plurality of equally-spaced grooves are provided in said outer surface of said valve pin.

6. An injection molding apparatus comprising:
   a first melt transfer nozzle having a first melt transfer channel for delivering a melt stream of moldable material through a first melt transfer gate;
   a second melt transfer nozzle having a second melt transfer channel for selectively receiving said melt stream from said first melt transfer channel through a second melt transfer gate;
   a first valve pin extending through said first melt transfer channel and being movable into said second melt transfer channel, said first valve pin having an outer diameter sized to restrict melt flow between said first melt transfer channel and said second melt transfer channel, and having at least one groove portion where said groove portion is movable across a portion of said first melt transfer channel and said second melt transfer channel to allow melt transfer between said first and second transfer channels, said valve pin further having at least one guiding portion, wherein said guiding portion of said first valve pin aligns said first valve pin within said first melt gate and said second melt gate; and a second valve pin extending through and movable within said second melt transfer channel.

7. The injection molding apparatus of claim 6, wherein said first and second valve pins substantially remain in contact with each other when said first and second valve pins move within said first and second melt transfer channels to prevent melt from coming therebetween.

8. An injection molding apparatus comprising:

a first melt transfer nozzle having a first melt transfer channel for receiving a melt stream of moldable material, said first melt transfer nozzle having a first melt transfer gate that is selectively closable by a first valve pin positioned within said first transfer channel;

a second melt transfer nozzle having a second melt transfer channel for receiving said melt stream of moldable material from said first melt transfer channel, said second melt transfer nozzle having a second melt transfer gate that is selectively closable by a second valve pin, said second valve pin being slidable through said second melt transfer channel in response to movement of said first valve pin; and a groove provided in said first valve pin, said first valve pin being movable relative to said first melt transfer nozzle and said second melt transfer nozzle to selectively locate said groove across a portion of said first melt transfer channel and a portion of said second melt transfer channel simultaneously, such that said groove forms a melt transfer channel therebetween to allow said melt stream of moldable material to flow through said first and second melt transfer gates from said first melt transfer channel to said second melt transfer channel.

9. The injection molding apparatus of claim 8, further comprising a groove provided in said second valve pin and said first valve pin being slidable through said first melt transfer channel in response to movement of said second valve pin.

10. A method of injection molding comprising:

providing a first melt transfer nozzle having a first valve pin positioned within said first transfer channel;

providing a second melt transfer nozzle having a second valve pin positioned within said second transfer channel;

providing a groove on one of said first valve pin or said second valve pin; and moving said first valve pin and said second valve pin to bring said groove into communication with said first melt transfer nozzle and said second melt transfer nozzle simultaneously to allow a molten material to flow between said first melt transfer nozzle and said second melt transfer nozzle along said groove.

11. An injection molding apparatus comprising:

a stationary platen;

a movable platen;

a first melt transfer nozzle coupled to said stationary platen, said first melt transfer nozzle having a first melt transfer channel for receiving a melt stream of moldable material under pressure;

a second melt transfer nozzle coupled to said movable platen, said second melt transfer nozzle having a second melt transfer channel for selectively receiving the melt stream from said first melt transfer channel;

a manifold coupled to said movable platen, said manifold having a manifold channel for receiving the melt stream from said second melt transfer channel and delivering the melt stream to a nozzle channel of a nozzle;

a mold cavity provided between said stationary platen and said movable platen, said mold cavity receiving the melt stream from said nozzle, said nozzle channel communicating with said mold cavity through a mold gate; and a first valve pin extending through said first melt transfer channel, said valve pin having an outer diameter sized to restrict melt flow between said first melt transfer channel and said second melt transfer channel, whereby said valve pin has at least one groove and at least one guiding portion, wherein said first valve pin is movable relative to said first and second melt transfer nozzles to selectively locate said groove and said guiding portion across a portion of said first melt transfer channel and a portion of said second melt transfer channel simultaneously to allow the melt stream to flow between said first melt transfer channel and said second melt transfer channel.

12. The injection molding apparatus of claim 11, wherein said movable platen carries a stack mold plate.

13. The injection molding apparatus of claim 11, wherein said movable platen carries a tandem mold plate.

14. The injection molding apparatus of claim 11, further comprising a second movable valve pin located at least partially in said second melt transfer nozzle.

15. The injection molding apparatus of claim 14, wherein said valve pins are actuated by independently movable actuators.

16. The injection molding apparatus of claim 15, wherein one of said first or second valve pins is actuated by the movement of the other of said first or second valve pins.

* * * * *